United States Patent Office 3,341,563
Patented Sept. 12, 1967

3,341,563
METHOD OF PREPARING SILYL AMINO ETHERS
Paul Büchheit, Heinrich Marwitz, and Siegfried Nitzsche, Burghausen, Bavaria, Germany, assignors to Wacker-Chemie G.m.b.H., Munich, Bavaria, Germany
No Drawing. Filed July 17, 1963, Ser. No. 295,823
Claims priority, application Germany, Aug. 3, 1963, W 32,731
5 Claims. (Cl. 260—448.8)

This invention relates to a novel method of preparing aminosilicon compounds and polymers.

A wide variety of silanes and siloxanes containing organo-functional or potentially reactive organic substituents have been introduced in recent years. Much of the research and commercial interest in organo-functional silicon materials has been centered on aminosilicon materials. The aminosilicon materials are known to have many uses. A particularly important application of these materials involves their use as bonding and binding agents on glass fibers in the preparation of glass fiber-organic resin laminates. The aminosilicon material can be used as a pre-treatment on the glass cloth or as an ingredient in the organic resins in preparing glass-fiber-organic resin laminates, particularly with melamine-type resins and epoxy-type resins.

The aminosilanes possess a degree of water solubility permitting their use in aqueous solution. The aqueous solutions aree stable for extended periods of time. The solutions do not cream and separate. The solutions are useful as modifying agents for polyurethanes inasmuch as they contain primary amino groups.

It is the object of this invention to introduce a novel reaction. The major contribution of this invention is a method for introducing organo-functional groups into silanes and siloxane polymers. A new and efficient method for producing aminosilanes and aminosiloxanes is an object of this invention. A generally applicable method of wide scope for introducing primary amino groups into that class of chemicals called "silicones" is also introduced by this invention. A widely applicable, efficient, economically advantageous method for preparing silylaminoethers is another object. Other objects and advantages of this invention are detailed in or will be apparent from the disclosure and claims following.

This invention consists of reacting (1) a (chloroorgano)silicon material of the general formula

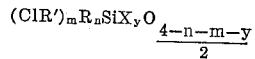

(2) an alkaliaminoalcoholate of the general formula YOR''NZ$_2$ to produce (3) a silylaminoether of the general formula

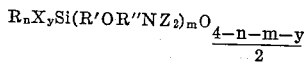

wherein each X is a hydrolyzable radical selected from alkoxy radicals, organic radicals composed of carbon atoms, hydrogen atoms and oxygen atoms present as ether linkages bonded to silicon through oxygen, and aminoalkoxy radicals, each R is a monovalent hydrocarbon radical, each R' is a divalent saturated aliphatic hydrocarbon radical, each R'' is a divalent saturated aliphatic hydrocarbon or aromatic hydrocarbon radical, each Y is an alkali metal atom, each Z is a hydrogen atom or a monovalent hydrocarbon radical, $m$ has an average value from .01 to 2.0, $n$ has a value of 0, 1, 2 or 3, $y$ has a value of 0, 1, 2 or 3 and $m+n+y$ does not exceed 4.

The (chloroorgano)silicon reactant can be a silane or a siloxane polymer. The formula defining this reactant is

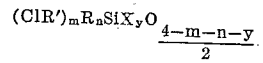

and when $m+n+y=4$ the reactant is a silane and when it is less than 4 the reactant is a siloxane polymer. The operable silanes contain at least one ClR'— group per silicon (i.e. $m$ is 1 or 2). The ClR' groups are chloroalkyl groups such as chloromethyl, chloroethyl, chloropropyl, chlorobutyl and chlorooctadecyl, with the preferred embodiments being of the formula ClC$_z$H$_{2z}$, where $z$ is 1–6 inclusive. Each R is a monovalent hydrocarbon radical bonded to silicon through Si—C bonding. Examples of the radicals represented by R are methyl, ethyl, propyl, hexyl, octadecyl, phenyl, diphenyl, anthracyl, tolyl, xylyl, ethylphenyl methylnaphthyl benzyl, phenylethyl, cyclopropyl, cyclobutyl, cyclohexyl, cyclohexenyl, cyclobutenyl, vinyl, allyl, methallyl and hexenyl. Preferred species of radicals represented by R and lower alkyl (1–6 carbon atoms), phenyl and vinyl.

The substituents represented by X are hydrolyzable groups. These groups are bonded to silicon through

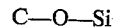

linkage and consist of alkoxy radicals such as CH$_3$O—, C$_2$H$_5$O— and C$_z$H$_{2z+1}$O— where $z$ is 1 to 6 inclusive as well as radicals composed of carbon, hydrogen and oxygen present as ether linkages such as in

CH$_3$OC$_2$H$_4$O— and C$_2$H$_5$OC$_2$H$_4$OC$_2$H$_4$O— and aminoalkoxy groups such as —OCH$_2$CH$_2$NH, —OCH$_2$CH$_2$CH$_2$NH$_2$ and —OCH$_2$CH$_2$NHCH$_2$CH$_2$NH$_2$.

As noted above, the operable silanes are represented by the general formula when the sum of the subscripts $m+n+y=4$. In such silanes $m$ can be 1 or 2, $n$ can be 0, 1, 2 or 3 and $y$ can be 0, 1, 2 or 3. In the operable siloxane polymers, the sum of $m+n+y$ must be less than 4, $n$ has an average value of 0–2, $y$ has an average value from 0–2 and $m$ has an average value from .01 to 2.0 (i.e. the polymer has at least one chloroalkyl group bonded to silicon per 100 silicon atoms and can have 2 such groups per silicon atom). The operable siloxanes are polymers and copolymers including, for example, homopolymers of units of the formula

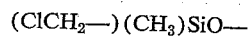

as well as copolymers containing at least one

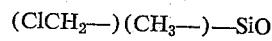

unit and other units selected from units of the formulae RSiO$_{3/2}$, R$_2$SiO, R$_2$SiO$_{1/2}$ and SiO$_{4/2}$. The polymers and copolymers can also contain residual X groups if prepared under mild hydrolysis conditions. These polymers and copolymers vary from thin fluids of about 1 cs. viscosity at 25° C. to high polymeric materials which can be gum-like in appearance. The high polymeric materials are used in solvent solution to facilitate reaction.

The second reactant is an alkali metal aminoalcoholate of the formula YOR''NZ$_2$ where Y is an alkali metal atom such as Li, Na, K, Rb and Cs and each Z is a hydrogen atom or a monovalent hydrocarbon radical such as defined for R above. The R″ in this formula represents divalent hydrocarbon radicals such as $$-CH_2-, \ -CH_2CH_2-, \ -CH_2CH(CH_3)CH_2CH_2-$$
$$-CH_2CH_2CH_2-, \ -CH_2CH_2CH_2CH_2-$$
$$-CH_2CH_2CH_2CH(C_2H_5)CH_2CH_2- \ \text{and} \ -C_zH_{2z}-$$

where z is 1–6 in general, as well as divalent aromatic radicals such as $$-C_6H_4-, \ -C_6H_3(CH_3)-, \ -C_6H_2(CH_3)_2-$$
$$-C_6H_4-C_6H_4-$$

and equivalent divalent derivatives of anthracene. The alkali metal alcoholate can be added to the reaction zone per se or it can be formed in situ by adding the alkali metal, preferably in finely-divided form, and the corresponding aminealcohol of the formula HOR″NH$_2$ where R″ is as above defined. Preferred aminoalcoholates are those wherein Z is a hydrogen atom or an alkyl radical of 1–6 carbons.

The reactants are admixed in any desired order in the presence or absence of an inert organic solvent such as toluene, xylene, and petroleum derived solvents in general. The reaction can, of course, be accelerated by heating but frequently an exothermic reaction actually requiring cooling occurs. The proportions of reactants employed depends upon the ratio of ClR′— groups in reactant (1) to be modified. Thus, at least one equivalent of YOR″NZ$_2$ can be present for each ClR′— group in reactant (1) or a smaller proportion of YOR″NZ$_2$ can be present to produce a silane or siloxane containing residual ClR′ groups. The reaction can be carried out at atmospheric pressure if desired. Reaction temperatures range from room temperature to the reflux temperature of the solvent employed generally 50°–150° C. but this is not critical and can be determined by the reaction rate desired as well as the reactants involved.

It is apparent the products of this invention can be silanes containing hydrolyzable groups represented by X. These silanes can be hydrolyzed and condensed by known procedures to produce the corresponding siloxanes. The silanes can also be cohydrolyzed with silane such as R$_w$SiX$_{4-w}$ where R is a monovalent hydrocarbon radical, w is 0–4 and X is a hydrolyzable atom or group to produce copolymers.

The reaction by-produces alkali metal chloride (e.g. NaCl) which can be removed from the reaction mass by any desired means, particularly filtering.

The products of this invention are widely useful as organofunctional silicon compounds. They can be used as priming agents on a wide variety of substrates, particularly on glass fibers. They can be used in conjunction with organic resins in producing laminates. They can be employed as additives in polyurethane foams and in all other applications known for use of aminosilanes and aminosiloxanes.

The products of this invention are produced in a relatively simple manner and contain an amino group which is hydrolytically stable. These products display exceptional water solubility and stability in aqueous solutions when R″ is a lower aliphatic radical. On the other hand, when R″ is a divalent aromatic radical the silylaminoethers are water insoluble solids. All of the products of this invention react rapidly and quantitatively with potentially reactive materials such as isocyanates.

The following examples are included to aid those skilled in the art to gain a better understanding of this invention. The scope of the invention is not limited by the examples but is delineated in the appended claims. All parts and percentages are based on weight and all viscosities are measured at 25° C. unless otherwise stated.

*Example 1*

A reaction flask was fitted with a stirring rod, reflux condenser and influx vessel. The following reactants were introduced into the vessel: 2108 parts gamma-chloropropylmethyldiethoxysilane, 867 parts toluene, 230 parts metallic sodium and 1832 parts monoethanolamine. The reactants were introduced as follows: the silane and toluene were added and heated to the range 80°–100° C. and a solution of the sodium in monoethanolamine was then added gradually over a period of two hours. The resulting reaction was exothermic and NaCl precipitated from the reaction mass. The NaCl was removed by filtration and the toluene and ethanol were removed by distillation. A yield of 2450 parts of an amber colored, viscous oil was obtained and was characterized by density at 20° C. of 1.0470, refractive index of 1.4711 at 30° C.

The oil obtained above was hydrolyzed by adding 400 parts of the oil to 500 parts water and heating to 60°–90° C. for one hour with concurrent stirring. The mixture is originally clear and upon heating becomes turbid forming oily droplets which are heavier than the water and form an oily layer at the bottom of the reaction vessel. The mass forms a two phase system with a water layer saturated with NaCl and an oily layer. The reaction mass is extracted a number of times with ether and the combined ether extracts are washed with water to remove aminoethanol formed as a by-product. The ether is distilled off and 255 parts of a viscous yellowish oil is obtained and nitrogen analysis confirms the product is a polymer of the average unit formula $$H_2NCH_2CH_2O(CH_2)_3Si-(CH_3)O$$

*Example 2*

Employing the method and equipment of Example 1, 1827 parts ClCH$_2$(CH$_3$)Si(OC$_2$H$_5$)$_2$, 867 parts toluene and 840 parts sodium monoaminoethanolate in 1221 parts monoethanolamine were reacted. The NaCl formed was removed and volatiles were distilled off to produce 2238 parts of the desired products which was an oil of light yellow color.

The oil obtained above was hydrolyzed by mixing 350 parts oil with 500 parts water heated at 60°–80° C. for two hours with stirring. The aqueous phase became saturated with NaCl. The heterogeneous system was cooled, extracted with ether and the ether extracts were washed with water. The ether was then removed by heating and 200 parts of a thick, fluid oil was obtained.

*Example 3*

1935 parts of the compound $$(C_2H_5-O-C_2H_4-O-C_2H_4-O-)_2$$
$$-Si(CH_3)-(CH_2CH_2CH_2Cl)$$

mixed with 500 parts diethyldiglycol were reacted as described above with 420 parts sodium monoaminoethanolate, dissolved in 600 parts monoethanolamine over a period of two hours. The NaCl formed was filtered out and the excess monoethanolamine and diethyldiglycol vacuum distilled off from the resulting almost colorless clear fluid. 2010 parts of a yellowish thick fluid readily water soluble oil was obtained containing 3.4 to 3.5 percent nitrogen in close agreement with the theoretical.

*Example 4*

In a reaction similar to Example 3, 1795 parts of the compound $$(C_2H_5-O-C_2H_4-O-C_2H_4-O-)_2Si(CH_3)(CH_2Cl)$$

are reacted with the solution of 115 parts sodium in 446 parts delta-aminobutanol NH$_2$—CH$_2$CH$_2$CH$_2$CH$_2$—OH and 500 parts diethyldiglycol and 1990 parts of a thick fluid oil are isolated in the manner described which contained 3.3–3.4 percent nitrogen in close agreement with theoretical expectations.

Example 5

The solution of 1366 parts of an organopolysiloxane of the unit formula $CH_3Si(O)CH_2CH_2CH_2Cl$-867 parts toluene, was mixed with the solution of 230 parts sodium-1600 parts monoaminoethanol and 100°–110° C. during a period of two hours. The NaCl separated out in a lively exothermic reaction. This was filtered out and the toluene was removed first at reduced pressure than the excess amino ethanol from the clear light yellowish organic phase which was obtained. 1560 parts of a thick fluid yellowish oil was obtained which reacted very energetically with isocyanate and contained 8.6–8.7 percent nitrogen as expected.

Example 6

Corresponding to the method described in Example 5, 1086 parts of a methylchloromethylpolysiloxane were heated with 32.6 percent chlorine in 867 parts toluene to 100°–110° C. and mixed with the solution of 230 parts sodium in 1600 parts aminoethanol at this temperature during a period of two hours. After separating the NaCl which was formed and removing the solvent and the excess amino alcohol 1290 parts of a thick fluid yellowish oil were isolated which contained 10.4–10.5 percent nitrogen in close agreement with the theoretically calculated value.

Example 7

1000 parts of chloromethyltriethoxysilane $$(C_2H_5O)_3SiCH_2Cl$$

obtained by esterification of chloromethyltrichlorosilane in a mixture with 867 parts toluene were mixed in small quantities at 80°–100° C. while stirring rapidly with a solution of 108 parts sodium in 1150 parts monoethanolamine. An exothermic reaction takes place while NaCl is separated out.

The clear organic phase obtained after filtering out the NaCl yielded a final 1210 parts of clear golden yellow thick fluid product after removal of the lower boiling toluene and ethanol components which contains nitrogen in proportion which was in close agreement with the value calculated for the compound $$(C_2H_5O)_3SiCH_2OCH_2CH_2NH_2$$

Example 8

In the same manner as described in Example 1, the mixture of 213 parts chloromethyltriethoxysilane and 400 parts tetrahydrofuran was mixed at 60°–70° C. with a suspension of 131 parts para-aminophenol-sodium in 300 parts tetrahydrofuran over a period of 2 hours in small quantities and stirred intensively for another two hours. After this time the solid was filtered out of the reaction system, washed with ether, dried, weighed, analyzed and established to be NaCl. The clear brown organic phase obtained is freed of solvent. 281 parts of a solid are obtained which is in good agreement with that for the values calculated for the compound $$(C_2H_5O)_3SiCH_2—O—C_6H_4NH_2$$

containing 54.62 percent C, 9.8 percent Si and 4.9 percent N.

Example 9

If 211 parts gamma-chloropropylmethyldiethoxysilane are incorporated instead of 213 parts chloromethyltriethoxysilane in the procedure of Example 8, 280 parts of a solid are obtained which is in good agreement with the calculated values of 59.21 percent C, 9.9 percent Si and 4.8 percent N for the compound $$(C_2H_5O)_2(CH_3)Si—CH_2CH_2CH_2—O—C_6H_4NH_2$$

Example 10

Equivalent results were achieved when Example 1 was repeated employing equivalent amounts of the following silanes in place of the gamma-chloropropylmethyldiethoxysilane:

Bis-(gamma-chloropropyl)diethoxysilane,
Chloroethylmethyldiethoxysilane,
Chlorohexylpropyldibutoxysilane,
Chloromethylethylbutylethoxysilane,
Chloropropylmethylvinylmethoxysilane,
Chloropropylphenyldiethoxysilane, and
Chloropropylmethylphenylaminopropoxysilane.

Example 11

Equivalent results were achieved when Example 2 was repeated employing equivalent amounts of the following in place of the sodium monoethanolate: $KOCH_2CH_2NH_2$, $LiOCH_2CH_2NH_2$, $CsOCH_2CH_2NH_2$
$NaOCH_2CH_2NH(CH_3)$, $NaOCH_2CH_2N(C_2H_5)_2$
$LiOC_6H_4C_6H_4NH_2$, $CsOC_6H_4N(CH_3)(C_2H_5)$ and $$NaOC_6H_{12}NH_2$$

That which is claimed is:

1. A silylaminoether of the formula $$R_nX_ySi(R'OR''NX_2)_m O_{\frac{4-n-m-y}{2}}$$

wherein each X is a hydrolyzable radical containing not more than 6 carbon atoms selected from the group consisting of alkoxy radicals, organic radicals composed of carbon atoms, hydrogen atoms and oxygen atoms present as ether linkages bonded to silicon through oxygen, and aminoalkoxy radicals, each R is a monovalent hydrocarbon radical containing 1 to 18 inclusive carbon atoms, each R' is a divalent saturated aliphatic hydrocarbon radical containing 1 through 18 inclusive carbon atoms, each R'' is a divalent radical containing 1 through 18 inclusive carbon atoms selected from the group consisting of saturated aliphatic hydrocarbon radicals and aromatic hydrocarbon radicals, each Z is a monovalent radical selected from the group consisting of hydrogen atoms and hydrocarbon radicals containing from 1 to 18 inclusive carbon atoms, $m$ has a value from 0.01 to 2.0 inclusive, $n$ has a value from 0 to 3 inclusive, $y$ has a value from 0 to 3 inclusive, and the sum of $n+m+y$ does not exceed 4.

2. A silylaminoether of the formula $$R_nX_ySi(R'OR''NZ_2)_m$$

wherein each X is a hydrolyzable radical containing not more than 6 carbon atoms selected from the group consisting of alkoxy radicals, organic radicals composed of carbon atoms, hydrogen atoms and oxygen atoms present as ether linkages bonded to silicon through hydrocarbon radical containing 1–18 inclusive carbon atoms, each R' is a divalent saturated aliphatic hydrocarbon radical containing 1–18 inclusive carbon atoms, each R'' is a divalent radical containing 1–18 inclusive carbon atoms selected from the group consisting of saturated aliphatic hydrocarbon radicals and aromatic hydrocarbon radicals, each Z is a monovalent radical selected from the group consisting of hydrogen atoms and hydrocarbon radicals containing 1–18 inclusive carbon atoms, $m$ has a value from 1 to 2 inclusive, $n$ has a value from 0 to 3 inclusive, $y$ has a value from 0 to 3 inclusive, and the sum of $n+m+y$ is 4.

3. A silylaminoether in accordance with claim 1 wherein R is a lower alkyl radical, X is an alkoxy radical, R' is a divalent radical of the formula $—C_zH_{2z}—$ where $z$ has a value from 1 to 6 inclusive, R'' is a divalent radical of the formula $—C_zH_{2z}—$ where $z$ has a value from 1 to 6 inclusive and Z is a hydrogen atom.

4.
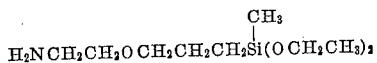
5. $H_2NCH_2CH_2OCH_2Si(OCH_2CH_3)_3$.
References Cited
UNITED STATES PATENTS
2,572,402  10/1951  Speier ------------ 260—448.2
OTHER REFERENCES
Eaborn, "Organosilicon Compounds," Academic Press Inc., New York, 1960, pages 411–412.
TOBIAS E. LEVOW, *Primary Examiner.*
SAMUEL H. BLECH, *Examiner.*
P. F. SHAVER, *Assistant Examiner.*